United States Patent
Gupta et al.

(10) Patent No.: US 12,526,017 B2
(45) Date of Patent: Jan. 13, 2026

(54) SYSTEM AND DESIGN METHOD OF MASSIVE MIMO RADIO UNIT

(71) Applicant: JIO PLATFORMS LIMITED, Ahmedabad (IN)

(72) Inventors: Deepak Gupta, Navi Mumbai (IN); Nekiram Khosya, Dombivali (IN); Amrish Bansal, Navi Mumbai (IN); Brijesh Shah, Navi Mumbai (IN); Renuka Nair, Dombivali (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,455

(22) PCT Filed: Mar. 11, 2023

(86) PCT No.: PCT/IB2023/052343
§ 371 (c)(1),
(2) Date: Mar. 31, 2023

(87) PCT Pub. No.: WO2023/187512
PCT Pub. Date: Oct. 5, 2023

(65) Prior Publication Data
US 2025/0226861 A1    Jul. 10, 2025

(30) Foreign Application Priority Data
Mar. 29, 2022    (IN) .............................. 202221018407

(51) Int. Cl.
*H04B 7/06*    (2006.01)
*H04B 1/40*    (2015.01)
(Continued)

(52) U.S. Cl.
CPC ............. *H04B 7/0617* (2013.01); *H04B 1/40* (2013.01); *H04B 7/0413* (2013.01); *H04W 16/18* (2013.01)

(58) Field of Classification Search
CPC ...... H04B 7/0617; H04B 1/40; H04B 7/0413; H04W 16/18
See application file for complete search history.

(56) References Cited

U.S. PATENT DOCUMENTS

| 2017/0012681 A1 | 1/2017 | Buliga et al. |
| 2025/0015845 A1* | 1/2025 | Gupta ................. H04B 7/0456 |

FOREIGN PATENT DOCUMENTS

| CN | 109547105 A | 3/2019 |
| EP | 3295766 A1 | 3/2018 |

OTHER PUBLICATIONS

International Search Report, PCT/IB2023/052343, mailed Jul. 3, 2023, Total pp. 03.

* cited by examiner

*Primary Examiner* — Curtis B Odom
(74) *Attorney, Agent, or Firm* — FINNEGAN, HENDERSON, FARABOW, GARRETT DUNNER, LLP

(57) ABSTRACT

The present disclosure relates to an 5G Massive MIMO Radio Unit (MRU) that is connected to a Combined Central and Distributed Unit (CCDU) on front haul interface using 25G optical interface and is compliant to 3GPP (Third Generation Partnership Project) based ORAN (Open Radio Access Network) specifications. The proposed 5G MRU can include a lower PHY (Physical) portion of L1 layer with network layer split of 7.2x, a baseband section, a RF (Radio Frequency) Front End module (RFEM), and an Antenna Filter Unit (AFU) as part of a single enclosure/unit for easy and efficient installation.

18 Claims, 5 Drawing Sheets

(51) Int. Cl.
*H04B 7/0413* (2017.01)
*H04W 16/18* (2009.01)

SYSTEM AND DESIGN METHOD OF MASSIVE MIMO RADIO UNIT

FIELD OF INVENTION

The present invention relates generally to network devices, and more particularly to design and architecture of a massive multiple-input multiple-output (MIMO) radio unit.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The 5G communication system is considered to be implemented in sub 6-GHz and higher frequency (millimeter (mm) Wave) bands, e.g., 60 gigahertz (GHz) bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large scale antenna techniques are discussed for use in 5G communication systems.

MIMO, (multiple-input, multiple-output) is a radio antenna technology that deploys one or more antennas at both the transmitter and receiver ends to increase the quality, throughput, and capacity of the radio link. MIMO uses techniques known as spatial diversity and spatial multiplexing to transmit independent and separately encoded data signals, known as "streams", reusing the same time period and frequency resource.

MIMO is used in many modern wireless and RF technologies, including Wi-Fi and Long-Term Evolution (LTE). 3GPP first specified MIMO for LTE in 2008 in its Release 8, which variant used two transmitters and two receivers, 2×2 MIMO, and subsequent enhancement in processing power has enabled use of more simultaneous data streams in wireless networks with current 4G LTE networks using 4×4 MIMO. The very short wavelengths at mm Wave frequencies result in smaller antenna dimensions and for 5G NR, 3GPP has specified 32 antennas (32×32 MIMO). This expansion in the size of MIMO antenna has led to the term Massive MIMO.

Massive MIMO is based on three key concepts of spatial diversity, spatial multiplexing, and beamforming. While existing disclosures pertaining to design/architecture of Massive MIMO Radio Units (MRUs) make the overall device very costly, high on power consumption, thermally inefficient, bulky and requires interoperability and coupling with various separate/currently independent/non-conformant, and cabled components such as antenna components and transceiver elements which complicates the overall design and construction. There is therefore a need for a MRU that can integrate all these components together efficiently, and accordingly offer a cost-effective solution where an integrated antenna filter unit (AFU) is used and which blind mates with RF Front End board, making it a cable-less design.

SUMMARY

The present disclosure relates to a radio unit comprising a High Speed Transceiver Board (HSTB) operatively coupled to a Combined Central and Distributed Unit (CCDU) on a fronthaul interface, said HSTB comprising a plurality of RF transceivers to receive digital signals from the CCDU and convert the received digital signals into RF signals across a plurality of RF chains; a RF Front End Module (RFEM) operatively coupled with the HSTB, said RFEM having one or more RF power amplifiers to receive the RF signals and amplify said RF signals; and an antenna filter unit (AFU) comprising an integrated MIMO antenna and a cavity filter to enable beamforming to a multi-user MIMO.

In an aspect, the radio unit is a Massive MIMO Radio Unit (MRU). In another aspect, the radio unit is an ORAN compliant 5G Massive MIMO Radio Unit (MRU). In yet another aspect, the radio unit is a multiple antenna configuration 32T32R based 5G Massive MIMO Radio Unit (MRU).

In another aspect, the HSTB can include the plurality of RF transceivers to generate a bit stream of the RF signals; a lower layer PHY section of L1 layer; and a baseband section to support 32 transmit and receive chains, said elements being configured on a dense set of layers of the HSTB.

In another aspect, the transceivers are FPGAs, and wherein the HSTB may include a plurality of FPGAs, wherein the digital signals received from the CCDU are converted into the RF signals using a first transceiver, and the other two transceivers act as a digital frontend to process the RF signals through one or more of Analog-to-Digital (ADC) converters and Digital-to-Analog (DAC) converters to generate analog signals that are subsequently transmitted to one or more RF connectors that would blind-mate with the RFEB. In another aspect, the HSTB interfaces with the CCDU on a predefined optical interface.

In an aspect, L1 higher layer is configured on the CCDU, and wherein the CCDU merges a central unit (CU) with a distributed unit (DU) and interfaces through the fronthaul interface with the radio unit. The radio unit can further include a clock synchronization architecture on the fronthaul interface using system synchronizer IC and clock generators. In another aspect, the RFEM can further include one or more low noise amplifiers (LNAs), gain blocks, and a plurality of RF switches for the plurality of transmit and receive chains that act as digital predistortion (DPD) feedback paths from Power Amplifiers (PAs) to FPGA for linearization.

In an aspect, each transmit chain carries matching balun, pre-driver amplification, and final RF power amplification as part of final stage of power amplification (PA), wherein each receive chain carries low noise amplifier (LNA) band pass SAW filter and matching network, and wherein each observation chain carries directional coupler, digital step attenuator (DSA) and matching network.

The RFEM can include or more layers and a receiver section that receives the amplified RF signals and decode the RF signals in the receiver section using the plurality of receivers, post which the RF signals are converted into digital and transmitted to upper layers having RF connectors. The RFEM can further include an RF TDD switch that combines each transmit-receive pair, and wherein one or more circulator(s) and cavity filter(s) are used between each RF switch and antenna port.

In an aspect, the integrated antenna is a MIMO antenna operatively coupled with a cavity filter, wherein the HSTB, RFEM, and the AFU of the radio unit are blind-mated through respective connectors.

In an exemplary implementation, the HSTB can receive external-48V input DC voltage, and down convert it to desired lower voltages based on requirements from different devices on the board. In another exemplary implementation, a combination of a power management integrated chipset (PMIC), a DC-DC converter, and a LDO regulators device are used to generate the desired lower voltages.

The present disclosure further relates to a user equipment (UE) communicatively coupled with a massive MIMO radio unit (RU). The coupling of the massive MIMO RU with the UE may include the steps of receiving a connection request, sending an acknowledgment of connection request to the radio unit and transmitting a plurality of signals in response to the connection request.

In an aspect, the present disclosure relates to a non-transitory computer readable medium including processor-executable instructions that cause a processor to receive a connection request, send an acknowledgment of connection request to a radio unit, and transmit a plurality of signals in response to the connection request, wherein said radio unit is a Massive MIMO unit as discussed herein.

OBJECTS OF THE INVENTION

An object of the present invention is to provide higher spectral efficiency by allowing its antenna array to focus narrow beams towards a user.

An object of the present invention is to provide higher energy Efficiency system as the antenna array is focused in a small specific section, it requires less radiated power and reduces the energy requirement in massive MIMO systems.

An object of the present invention is to increase the data rate and capacity of wireless systems.

An object of the present invention is to facilitate more reliable and accurate user tracking.

An object of the present invention is to eliminate high Power Consumption.

An object of the present invention is to reduce the Latency and increases the reliability of the network.

An object of the present invention is to provide a cable less design of Massive MIMO radio unit.

An object of the present invention is provide a Massive MIMO standalone unit placed in a single convection cooled enclosure and weighing less than 25-29 kg.

An object of the present invention is to provide a Massive MIMO standalone unit that comprises of lower layer PHY section, ORAN compliant Fronthaul on 25G optical interface, Digital Front End support for 32 transmit and receive chains using commercial grade three FPGAs.

An object of the present invention is to provide a Massive MIMO standalone unit that includes IEEE 1588v2 PTP based Clock synchronization architecture on 25G optical interface using system synchronizer IC and clock generators.

An object of the present invention is to provide a Massive MIMO standalone unit that includes Integrated 8×8 MIMO antenna with 32 Cavity filter as a one unit known as Antenna Filter Unit (AFU)

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
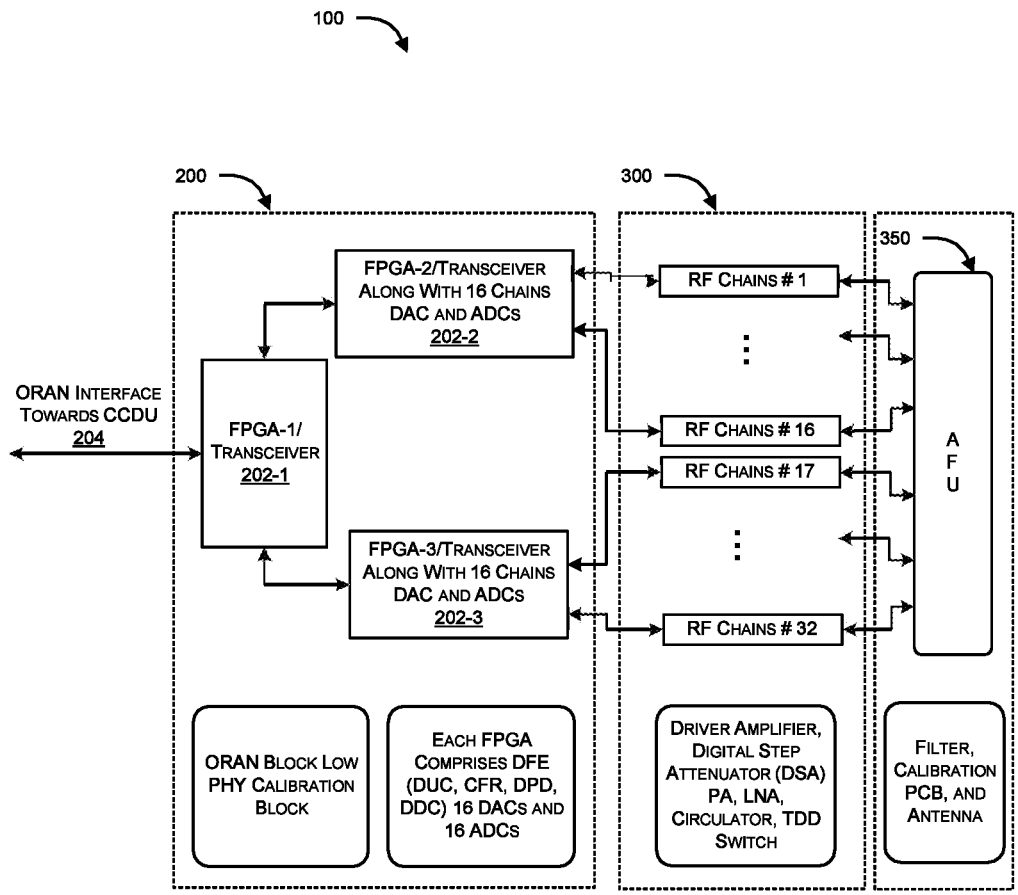
FIG. 1 illustrates an exemplary design architecture of a Massive MIMO Radio Unit in accordance with aspects of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the disclosure, various embodiments are described using terms used in some communication standards (e.g., 3rd generation partnership project (3GPP), extensible radio access network (xRAN), and open-radio access network (O-RAN)), but these are merely examples for description. Various embodiments of the disclosure may also be easily modified and applied to other communication systems.

Typically, a base station is a network infrastructure that provides wireless access to one or more terminals. The base station has coverage defined to be a predetermined geographic area based on the distance over which a signal may be transmitted. The base station may be referred to as, in addition to "base station," "access point (AP)," "evolved NodeB (eNodeB) (eNB)," "5G node (5th generation node)," "next generation NodeB (gNB)," "wireless point," "transmission/reception point (TRP)," or other terms having equivalent technical meanings.

The present disclosure relates to an ORAN compliant 5G Massive MIMO Radio Unit (MRU) (alternatively and interchangeably also referred to as "5G MRU" or "RU" hereinafter). In an exemplary and non-limiting embodiment, the present disclosure provides a hardware architecture and design of a multiple antenna configuration 32T32R based 5G Massive MIMO Radio Unit (MRU) for standalone mode, wherein the proposed 5G MRU is a radio unit (RU) connected to a Combined Central and Distributed Unit (CCDU) on Fronthaul interface using 25G optical interface and is compliant to 3GPP (Third Generation Partnership Project) based ORAN (Open Radio Access Network) specifications. The proposed MRU can be configured in a manner such that, in an exemplary implementation, there are three cell-cites and three (3) corresponding MRUs are used with the CCDU, wherein each MRU can be connected to the CCDU through the 25G interface.

In an exemplary aspect, the proposed 5G MRU comprises a lower PHY (Physical) portion of L1 layer with network layer split of 7.2× (O-RAN Alliance fronthaul specification between O-DU to O-RRU), a baseband section, a RF (Radio Frequency) Front End module (RFEM), and an Antenna Filter Unit (AFU) as part of a single enclosure/unit for easy and efficient installation. It is however to be appreciated that design and architecture of each of the components/units of the proposed RU is novel and inventive as regards the proposed invention is concerned and hence each would be protected through a respective patent application.

In an exemplary aspect, with respect to FIG. 1, the proposed 5G MRU 100 comprises a High Speed Transceiver Board (HSTB) 200 having a lower layer PHY section, an ORAN compliant Fronthaul on 25G optical interface 204, and a digital RF front end support for 32 transmit and receive chains using, for instance, commercial grade three FPGAs/transceivers (202-1 to 202-3, collectively referred to as 202 hereinafter), said elements/components being integrated on a highly dense 26 layers of the HSTB 200. It would be appreciated that while the disclosure is being explained with respect to a FPGA, any other equivalent transceiver is fully within the scope of the present disclosure, and therefore scope of each FPGA should be treated as that of any transceiver or technically equivalent component such as an ASIC.

In an exemplary aspect, the L1 lower layer PHY development and bit stream generation can be implemented/undertaken in the FPGA 202 itself. L1 higher layer can be configured on the CCDU below the tower, wherein the L2 and L3 are configured on the distributed unit, wherein a macro-site typically includes a central unit node (server side) and a distributed unit node (configured between the CU and RUs). The present invention merges the central unit node with the distributed unit node so as to form a CCDU that interfaces through the 25G optical interface with the RUs/MRUs. The proposed MRU can further include an IEEE 1588v2 PTP based clock synchronization architecture on the 25G optical interface 204 using system synchronizer IC and clock generators.

The proposed MRU 100 can further include an Integrated 8×8 MIMO antenna with 32 cavity filter as a one unit known as Antenna Filter Unit (AFU) 350. The proposed MRU 100, as configured, can be blind mated and possess a cable less design.

In an exemplary and non-limiting aspect of the present disclosure, the proposed 5G MRU 100 is a 200 W high power gNB that operates in macro class (typically 6.25 W or 38 dBm per antenna port), and is configured to provide macro-level wide-area solutions for coverage and capacity that can find utility in Dense Urban morphologies, and in hot zone/hot spot areas having high traffic and QoS demands. The proposed 5G MRU 100 brings together a lower layer PHY section, a RF transceiver based on commercial grade FPGAs for 32 transmit and receive chains (as part of the HSTB 200), a RF Front End Module (RFEM) 300 that includes RF power amplifiers, Low noise amplifiers (LNA), and RF switches for 32 chains, and a 8*8 MIMO antenna along with 32 cavity filters known as Antenna Filter Unit (AFU) 350 as part of a single convection cooled enclosure and weighing less than 25-29 kg. In an aspect, Macro gNB can provide good coverage and capacity for dense urban clutter owing to 8 beams in the downlink and 4 uplink beams support under multi-UE scenarios. The proposed 5G MRU 100 can be deployed at high rise buildings, dense clutters, and hotspot locations where traffic demand is significantly high and cannot be served by 4G gNB alone for coverage and capacity boosts.

In another aspect, the proposed 5G MRU can be configured as a design with integrated antenna and cavity filter solution without requiring use of cable, making it a cable less design. The proposed MRU 100 can be deployed in tower sites, GBTs and GBMs. The MRU can be deployed quickly so as to deliver high performance with low power consumption, making the MRU a power efficient solution. The proposed MRU can be connected to a CCDU below the tower on a single 25G optical front haul interface that is 3GPP ORAN compliant.

In an aspect, the proposed 5G MRU is a high power gNB (Next Generation Node B) that operates in macro class (typically ≤38 dBm per antenna port), and can be configured to complement macro-level wide-area solutions for coverage and capacity. In an exemplary aspect, high level architecture of the proposed 32T32R 5G NR MRU can include a High Speed Transceiver Board (HSTB) 200, a 32T32R RF Frond End Module (RFEM) Board 300, an Antenna Filter Unit (AFU) 350, and a mechanical housing (in an instance, there can be two housings, one for the HSTB 200 and one for the RFEM 300). The proposed MRU construction further facilitates and enables optimal heat dissipation owing to operation in weather conditions ranging from −10 degrees to 50 degrees C.

In an exemplary aspect, the proposed 5G NR MRU 100 brings together lower layer PHY section, RF transceiver based on commercial grade FPGAs for 32 transmit and receive chains with the RF sampling (No Intermediate Frequency stage) (as part of the HSTB 200), RF front end module (RFEM) 300 that includes RF power amplifiers, Low noise amplifiers (LNA), and RF switches for 32 chains, and 8*8 MIMO antenna along with 32 cavity filters known as Antenna Filter Unit (AFU) 350 in a single convection cooled enclosure and weighing≤29 kg.

In an exemplary implementation, the proposed MRU 100 comprises 64 connectors, 32 on each of transmit and receive side, and two DC connectors, each connector having 25 pins, making it 50 pins across the two DC connectors. These connectors are configured on the HSTB 200 in manner such that they blindly connect/map/mate/sandwich with the RFEM board 300, one on top of the other.

In an aspect, the proposed design architecture comprises of a control plane, user plane, and a synchronization plane, wherein the control plane is configured to control the configuration of the units/sub-units that form part of the proposed MRU 100 from a distance-place perspective, and wherein the user plane comprises of the user data, and finally wherein the synchronization plane is configured to utilize precision time-based protocol (PTP) on the instant 25G interface so as to synchronize the unit/sub-units with respect to a global clock using a timing protocol (i.e. the slave device would sync its clock with the master device in terms of the phase and the frequency), and maintain consistency/sync with the CCDU.

It would be appreciated that the proposed MRU meets all the RF performance requirements mentioned in 3GPP standard (TS 38.141) after integrating TDD based 5G NR MRU with Crest Factor Reduction (CFR) and digital pre-distortion (DPD) modules in digital front end lineup. Furthermore, the MRU has low power consumption and thermally handled optimally by the IP65 ingress protected mechanical housing.

In further example of the present disclosure, some or all of the steps of communication may be conducted by the MIMO base station, for example being performed by processing software or functionality within the MIMO base station itself. In an example of the M-MIMO base station, which may implement some or all of the steps of communication method, for example on receipt of suitable instructions from a computer program. The MIMO base station may comprise interfaces, a processor, and a memory. The memory contains instructions executable by the processor such that the MIMO base station is operative to conduct some or all of the steps of the communication method. The instructions stored on the memory may in some examples comprise the computer program. The MIMO may be dynamically managed based on the operating conditions. Furthermore, the disclosed massive multiple-input multiple-output (MIMO) radio unit may support all the frequency bands.

High Speed Transceiver Board (HSTB) 200

Figure 2:
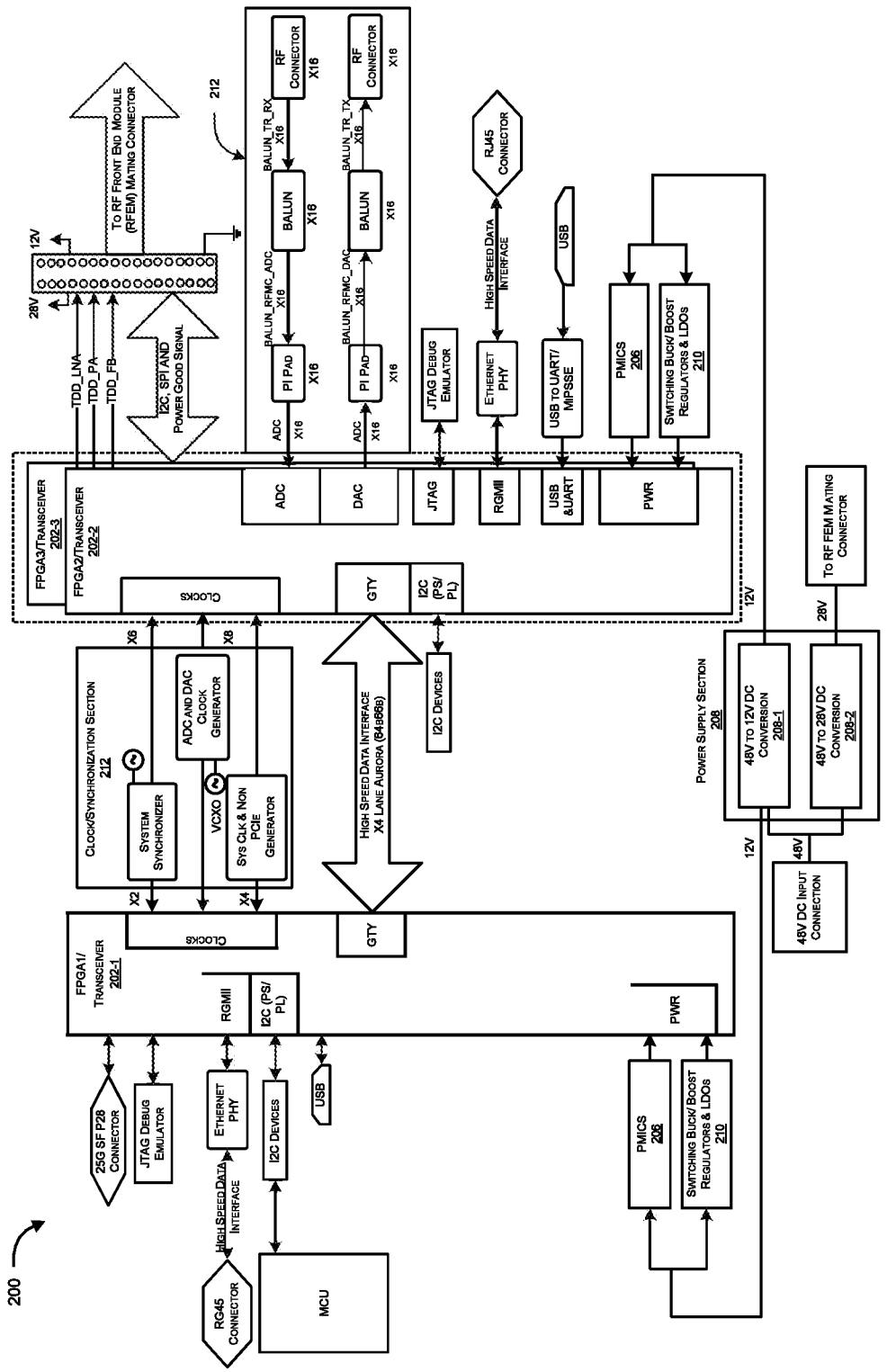
FIG. 2 illustrates an exemplary design architecture of a High Speed Transceiver Board (HSTB) in accordance with aspects of the present disclosure.
Figure 3:
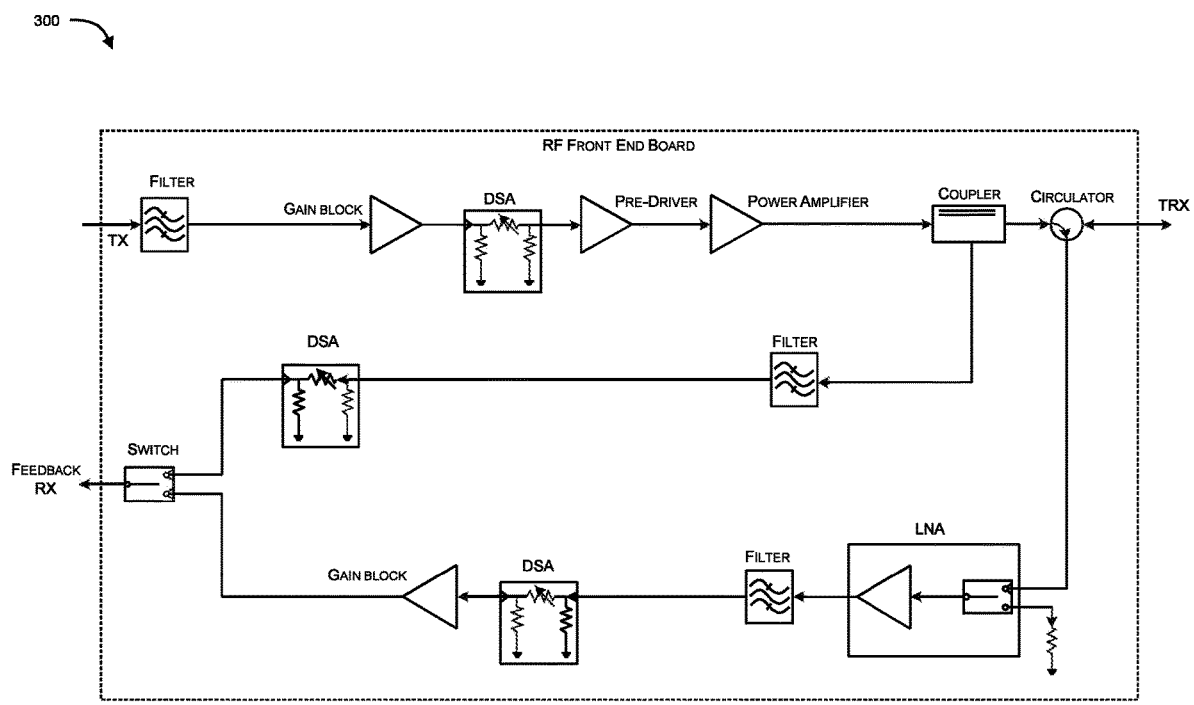
FIG. 3 illustrates an exemplary design architecture of a RF Front End Module (RFEM or RFFE) Board in accordance with aspects of the present disclosure.

In an exemplary aspect, with reference to FIGS. 1 and 2, HSTB 200 can include three (3) FPGA chipsets 202-1, 202-2, and 202-3 for lower L1 layer processing and digital front end section. HSTB 200 can be configured to receive external-48V input DC voltage and down convert it to various lower voltages (such as to 12V and then 12V to 5V and 1V among other combinations as desired) based on requirements from different devices on board. Any or a combination of the power management integrated chipset (PMIC) 206, DC-DC converters 208, and LDO regulators devices 210 can be used to generate these desired voltages.

In an exemplary implementation, the transceiver 202-1 can be configured to receive digital data/signals from the CCDU and transmitted to transceivers 202-2/202-3 which would covert the digital data into RF signals across the 32 RF chains (for instance, one transceiver can process/take care of 16 chains/control signal and power, and the second transceiver can further take care of/process 16 chains/control signal and power) (which would be blind mated DC wise as well as RF wise), which would be operatively coupled with the RF board 212. RF board 212 being a passive element gets power from the HSTB 200 in order to reduce and optimize the overall costs and derive as much power as is required from the HSTB 200 itself.

In an aspect, the complete system can be synchronized (using, for instance, a clock/synchronization section 214) within the HSTB 200 through IEEE 1588v2 based PTP on 25G Fronthaul interface 204 while running PTP client to on board synchronization circuit. The proposed circuit can include any or a combination of ultra-low noise clock generation PLLs, a programmable oscillator, and a system synchronizer. FIG. 2 illustrates an exemplary overall design architecture of the proposed HSTB that can include subsystems including but not limited to FPGA based RF transceivers, digital high-speed signals, switching power supplies, clock section and radio frequency signal that are designed on a 26 or more Layers PCB. The PCB design can include unique design techniques to route RF signals and aurora signals running on high speed 25GT/s on adjacent layers and meet design specifications.

In an aspect, the HSTB can be configured to obtain, through a 25 Gigabit fiber interface (exemplary), at a transceiver (such as FPGA), data from the CCDU residing on the ODC (outdoor cabinet), and process the obtained digital data to provide RF signal(s). The other two transceivers can then be configured to act as a digital frontend so as to process the high speed RF signals through Analog-to-Digital (ADC) converters and Digital-to-Analog (DAC) converters. The analog signals would then be transmitted to the RF connectors that would blind-mate with the RFEB 300. Transceiver configured on the HSTB can be configured to provide a 78-Band (exemplary) RF signal for 32 chips in the transmit and 32 chips in the receive. In an exemplary aspect, size of the proposed HSTB can be around 530*360 mm and would be configured as a 26 or more layers board.

32T32R RF Front End Module (RFEM or RFFE) Board 300

In an exemplary aspect, the RFEM board 300 can be configured to receive control signals (RF signals) from the HSTB 200 along with a power supply through a connector. RFFE/RFEM board can be configured act as a signal extended so as to incorporate 32 transmit chains for signal transmission, 32 receive chains for signal reception, and 32 observation chains that can act as Digital Predistortion (DPD) feedback paths from Power Amplifiers (PAs) to FPGA for linearization. RFEM board essentially, using gain blocks and power amplifiers, amplifies each received RF signal from the HSTB across each chain so as to generate power of 6.25 watts from each chain. Considering 32 chains that form part of the proposed RFEM board, a cumulative power of around 200 Watts is generated, equating to 53 dBm. In an aspect, each transmit chain can be configured to carry matching balun, pre-driver amplification, and final RF power amplification as part of the final stage of power amplification (PA). In an exemplary aspect, the power consumption of the proposed MRU is around 780-800 W and therefore for 200 W delivery, the system power conservation efficiency is around ~25%.

Each receive chain, on the other hand, can be configured to carry low noise amplifier (LNA) band pass SAW filter and matching network. Each observation chain can be configured to carry directional coupler, digital step attenuator (DSA) and matching network.

In an aspect, the RFEM board can include 10 or more layers and can include a receiver section that can receive amplified RF signal from the 5E user equipment (UE) and decode the signals in the receiver section using 32 receivers, post which the RF signal is converted into digital and transmitted to the upper layers having RF connectors.

In an aspect, the proposed board can include an RF TDD switch that can combine each transmit-receive pair. Circulator and Cavity filter(s) can be used between each RF switch to antenna port. In an aspect, RF Front End Board (RFFE) can be configured to blind mate with High Speed Transceiver Board (HSTB), thus removing the complexity of cable routing to avoid RF signal oscillations. The mating bullets provides robust connection between HBTB and RFFE so to meet optimal design considerations including but not limited to providing target 200 W output power.

Antenna Filter Unit (AFU) 350

In an exemplary aspect, the proposed AFU comprises a cavity filter and an 8*8 MIMO (128 Single antenna elements) antenna unit with calibration PCB in one integrated unit known as the AFU, which is blind mated with the RFEB and is configured to enable beamforming to the multi-user MIMO. The AFU, in an exemplary implementation/design, can be configured to be coupled to the housing from below, wherein the board would be placed in an aluminium metal housing having a covering on the bottom side. In an aspect, the AFU and the RFEB would be configured on the HSTB along a transmission line which is cylindrical in shape from both the sides which would be connected between two connectors like a pole so that there are two receptacles and between that a pillar is configured that would connect these units/sub-units.

The proposed AFU can include a 32-port (32 antenna ports as receiver and transmitted are coming to the same antenna port, wherein the 32 ports would be connected to corresponding/respective 32 cavity filters) cavity filter for 32T3R configuration that provides steeper roll-off outside operating band. The proposed AFU enables unique radiation pattern, low loss, and low interference.

In an aspect, the proposed MRU is able to achieve system noise figure levels of 3.5-3.6 dB owing to the design and layout of the MRU architecture and reduction in the amount of the losses and the number of cables and enabling blind-mating.

Figure 4:
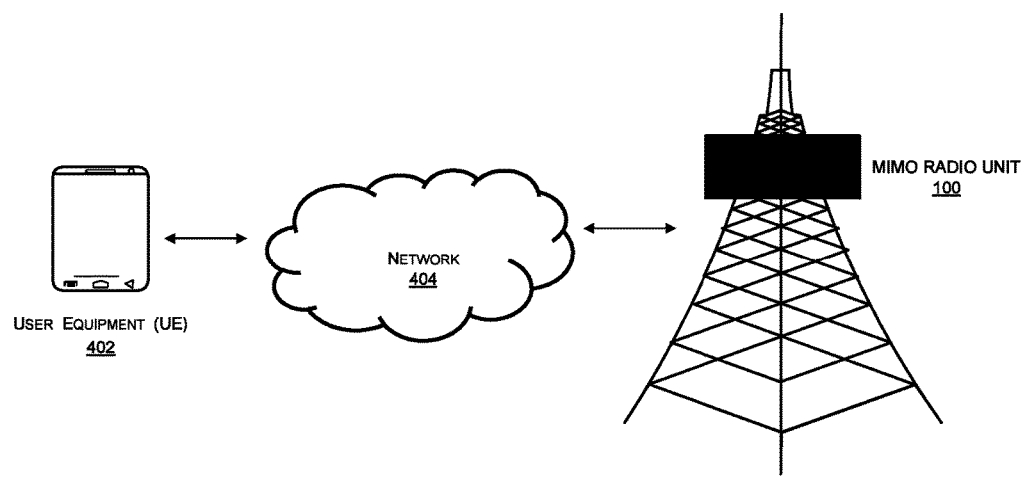
FIG. 4 illustrates an exemplary coupling representation of a user equipment (UE) with the MIMO radio unit in accordance with aspects of the present disclosure.

FIG. 4 illustrates an exemplary coupling representation of a user equipment (UE) with the MRU. As illustrated, the UE 402 may be communicatively coupled to the MRU 100. The coupling can be through a wireless network 404. In an exemplary embodiment, the communication network 404 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The UE 402 can be any handheld device, mobile device, palmtop, laptop, smart phone, pager and the like. As a result of the coupling, the UE 402 may be configured to receive a connection request from the MRU 100, send an acknowledgment of connection request to the MRU 100 and further transmit a plurality of signals in response to the connection request.

Exemplary Computer System 500

Figure 5:
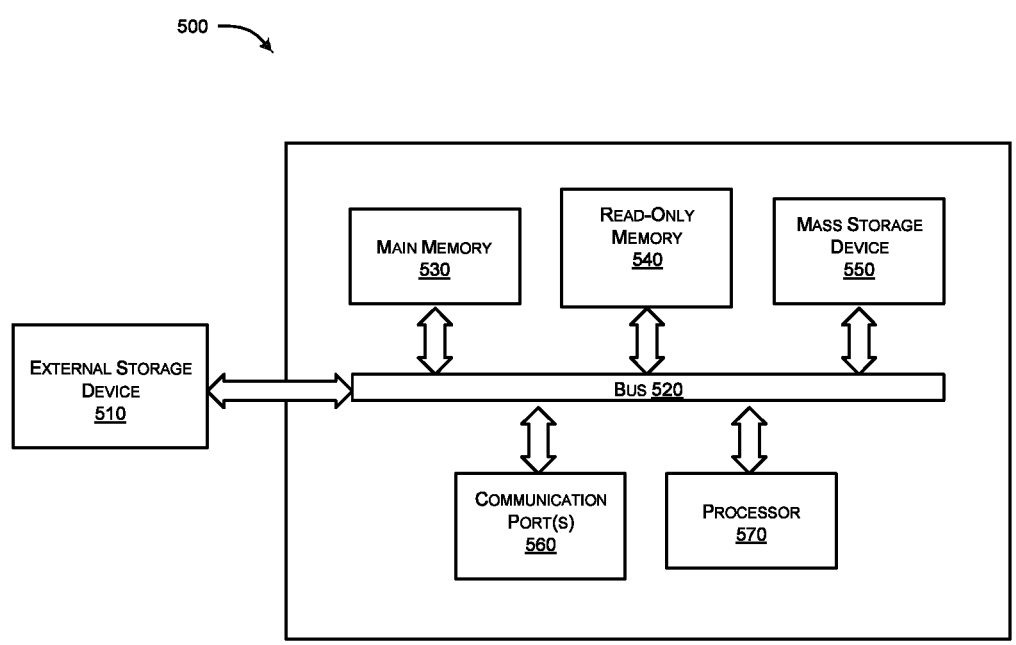
FIG. 5 illustrates an exemplary computer system in which or with which embodiments of the present invention can be utilized in accordance with embodiments of the present disclosure.

FIG. 5 illustrates an exemplary computer system in which or with which embodiments of the present invention can be utilized in accordance with embodiments of the present disclosure. As shown in FIG. 5, computer system 500 can include an external storage device 510, a bus 520, a main memory 530, a read only memory 540, a mass storage device 550, communication port 560, and a processor 570. A person skilled in the art will appreciate that the computer system may include more than one processor and communication ports. Processor 570 may include various modules associated with embodiments of the present invention. Communication port 560 can be any of an RS-232 port for use with a modem based dialup connection, a 10/100 Ethernet port, a Gigabit or 10 Gigabit port using copper or fibre, a serial port, a parallel port, or other existing or future ports. Communication port 560 may be chosen depending on a network, such a Local Area Network (LAN), Wide Area Network (WAN), or any network to which computer system connects. Memory 530 can be Random Access Memory (RAM), or any other dynamic storage device commonly known in the art. Read-only memory 540 can be any static storage device(s). Mass storage 550 may be any current or future mass storage solution, which can be used to store information and/or instructions.

Bus 520 communicatively couples processor(s) 570 with the other memory, storage and communication blocks.

In an embodiment, an apparatus comprising the radio unit may be disclosed. The radio unit may comprise a High Speed Transceiver Board (HSTB) operatively coupled to a Combined Central and Distributed Unit (CCDU) on a fronthaul interface, said HSTB comprising a plurality of RF transceivers to receive digital signals from the CCDU and convert the received digital signals into RF signals across a plurality of RF chains; a RF Front End Module (RFEM) operatively coupled with the HSTB, said RFEM having one or more RF power amplifiers to receive the RF signals and amplify said RF signals; and an antenna filter unit (AFU) comprising an integrated MIMO antenna and a cavity filter to enable beamforming to a multi-user MIMO.

Optionally, operator and administrative interfaces, e.g. a display, keyboard, and a cursor control device, may also be coupled to bus 520 to support direct operator interaction with a computer system. Other operator and administrative interfaces can be provided through network connections connected through communication port 560. Components described above are meant only to exemplify various possibilities. In no way should the aforementioned exemplary computer system limit the scope of the present disclosure.

Advantages of the Present Invention

The present invention provides higher spectral efficiency by allowing its antenna array to focus narrow beams towards a user.

The present invention provides higher energy Efficiency system as the antenna array is focused in a small specific section, it requires less radiated power and reduces the energy requirement in massive MIMO systems.

The present invention increases the data rate and capacity of wireless systems.

The present invention facilitates more reliable and accurate user tracking.

The present invention eliminates high Power Consumption and is thermally handed properly by the IP65 ingress protected Mechanical housing.

The present invention reduces the Latency and increases the reliability of the network.

The disclosed Massive MIMO provides more physical security.

The present invention meets all the RF performance requirement mentioned in 3GPP standard (TS 38.141) after integrating TDD based 5G NR MRU with Crest Factor Reduction (CFR) and Digital Pre Distortion (DPD) modules in Digital Front End lineup.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

We claim:

1. A radio unit comprising
    a High Speed Transceiver Board (HSTB) (200) operatively coupled to a Combined Central and Distributed Unit (CCDU) on a fronthaul interface, said HSTB comprising a plurality of RF transceivers to receive digital signals from the CCDU and convert the received digital signals into RF signals across a plurality of RF chains;
    a RF Front End Module (RFEM) (300) operatively coupled with the HSTB (200), said RFEM (300) having one or more RF power amplifiers to receive the RF signals and amplify said RF signals; and
    an antenna filter unit (AFU) comprising an integrated MIMO (Multiple Input, Multiple Output) antenna and a cavity filter to enable beamforming to a user.

2. The radio unit as claimed in claim 1, wherein the radio unit is a Massive MIMO Radio Unit (MRU).

3. The radio unit as claimed in claim 1, wherein the HSTB comprises the following components:
    the plurality of RF transceivers to generate a bit stream of the RF signals;
    a lower layer PHY section of L1 layer; and
    a baseband section to support a plurality of transmit and receive chains, said components of the HSTB being configured on a dense set of layers.

4. The radio unit as claimed in claim 3, wherein the transceivers are Field Programmable Gate Arrays (FPGAs), and wherein the HSTB comprises a plurality of FPGAs, wherein the digital signals received from the CCDU are converted into the RF signals using a first transceiver, and other two transceivers act as a digital frontend to process the RF signals through one or more of Analog-to-Digital (ADC) converters and Digital-to-Analog (DAC) converters to generate analog signals that are subsequently transmitted to one or more RF connectors that would blind-mate with the RFEB (300).

5. The radio unit as claimed in claim 1, wherein the HSTB interfaces with the CCDU on a predefined optical interface.

6. The radio unit as claimed in claim 1, wherein L1 higher layer is configured on the CCDU, and wherein the CCDU merges a central unit (CU) with a distributed unit (DU) and interfaces through the fronthaul interface with the radio unit.

7. The radio unit as claimed in claim 1, wherein the radio unit further comprises a clock synchronization module on the fronthaul interface using system synchronizer and clock generators.

8. The radio unit as claimed in claim 3, wherein the RFEM (300) further comprises one or more low noise amplifiers (LNAs), gain blocks, a plurality of RF switches for the plurality of transmit and receive chains, and a plurality of observation chains that act as digital predistortion (DPD) feedback paths from Power Amplifiers (PAs) to FPGA for linearization.

9. The radio unit as claimed in claim 8, wherein each transmit chain carries matching balun, pre-driver amplification, and final RF power amplification as part of final stage of power amplification (PA), and wherein each receive chain carries low noise amplifier (LNA) band pass SAW filter and matching network, and wherein each observation chain carries directional coupler, digital step attenuator (DSA) and matching network.

10. The radio unit as claimed in claim 1, wherein the RFEM comprises one or more layers and a receiver section that receives the amplified RF signals and decode the RF signals in the receiver section using a plurality of receivers, post which the RF signals are converted into digital and transmitted to upper layers having RF connectors.

11. The radio unit as claimed in claim 3, wherein the RFEM comprises an RF Time Division Duplex (TDD) switch that combines each transmit-receive chain pair, and wherein one or more circulator(s) and cavity filter(s) are used between each RF switch and antenna port.

12. The radio unit as claimed in claim 1, wherein the integrated antenna is a MIMO antenna operatively coupled with a cavity filter.

13. The radio unit as claimed in claim 1, wherein the HSTB, RFEM, and the AFU of the radio unit are blind-mated through respective connectors.

14. The radio unit as claimed in claim 1, wherein the HSTB (200) receives external −48V input DC voltage and down converts it to desired lower voltages based on requirements from different devices on the board.

15. The radio unit as claimed in claim 14, where any or a combination of a power management integrated chipset (PMIC) (206), a DC-DC converter (208), and a LDO regulators device (210) are used to generate the desired lower voltages.

16. An apparatus comprising the radio unit as claimed in claim 1.

17. A user equipment (UE) communicatively coupled with a radio unit (RU), said coupling comprises steps of:
   receiving a connection request;
   sending an acknowledgment of connection request to the radio unit;
   transmitting a plurality of signals in response to the connection request, wherein said radio unit is a Massive MIMO unit as claimed in claim 2.

18. A non-transitory computer readable medium comprising processor-executable instructions that cause a processor to:
   receive a connection request;
   send an acknowledgment of connection request to a radio unit; and
   transmit a plurality of signals in response to the connection request, wherein said radio unit is a Massive MIMO unit as claimed in claim 2.

* * * * *